United States Patent
Richardson et al.

(10) Patent No.: US 9,852,473 B2
(45) Date of Patent: Dec. 26, 2017

(54) INSURANCE POLICY RENEWAL CHAIN

(75) Inventors: John H. Richardson, Wilkes-Barre, PA (US); Carl J. Witkowski, Duryea, PA (US)

(73) Assignee: WESTGUARD INSURANCE COMPANY, Wilkes-Barre, PA (US)

(*) Notice: Subject to any disclaimer, the term of this patent is extended or adjusted under 35 U.S.C. 154(b) by 71 days.

(21) Appl. No.: 12/693,060

(22) Filed: Jan. 25, 2010

(65) Prior Publication Data

US 2010/0185469 A1 Jul. 22, 2010

Related U.S. Application Data

(62) Division of application No. 10/906,271, filed on Feb. 11, 2005, now abandoned.

(51) Int. Cl.
*G06Q 40/08* (2012.01)
*G06Q 50/22* (2012.01)
*G06F 17/30* (2006.01)

(52) U.S. Cl.
CPC ............ *G06Q 40/08* (2013.01); *G06Q 50/22* (2013.01); *G06F 17/30011* (2013.01); *G06F 17/30312* (2013.01); *G06F 17/30622* (2013.01)

(58) Field of Classification Search
CPC .. G06Q 40/08; G06Q 50/22; G06F 17/30312; G06F 17/30622; G06F 17/30011
USPC .......................................................... 705/4
See application file for complete search history.

(56) References Cited

U.S. PATENT DOCUMENTS

| | | | |
|---|---|---|---|
| 5,235,507 A | 8/1993 | Sackler et al. | |
| 5,586,313 A | 12/1996 | Schnittker et al. | |
| 5,857,207 A | 1/1999 | Lo et al. | |
| 5,950,214 A | 9/1999 | Rivette et al. | |
| 6,366,930 B1 | 4/2002 | Parker et al. | |
| 2002/0022976 A1 | 2/2002 | Hartigan | |
| 2002/0069090 A1 | 6/2002 | De Grosz et al. | |
| 2002/0147742 A1* | 10/2002 | Schroeder | 707/501.1 |
| 2003/0135520 A1 | 7/2003 | Mitchell et al. | |

(Continued)

OTHER PUBLICATIONS

Tom Thompson, "Charge-Coupled Devies" ComputerWorld, Aug. 6, 2001.*

(Continued)

*Primary Examiner* — Scott S Trotter
(74) *Attorney, Agent, or Firm* — IP Authority, LLC; Ramraj Soundararajan

(57) ABSTRACT

A system and method for the automatic linking of expired, current, and future insurance policies is provided. Within each insurance policy is a plurality of conditions frequently used in the determination of an insurance policy premium or rate quote. Such terms are calculated based upon information either associated with or obtained from a particular policyholder. By automatically linking policy information and policy terms from prior insurance policies, information previously submitted by a policyholder or calculated in regards to activity on a particular policy is used in automatic calculation and generation of a future policy term. Thus, straight-thru processing is achieved via organizing of prior policies for assistance in renewals, loss ratio calculations, shifts in payroll numbers (i.e., the number of employees insured under a single policy), and previous claim activity under the same type of policy.

7 Claims, 4 Drawing Sheets

(56) References Cited

U.S. PATENT DOCUMENTS

2003/0167191 A1* 9/2003 Slabonik et al. ................. 705/4
2004/0186750 A1* 9/2004 Surbey et al. .................... 705/4

OTHER PUBLICATIONS

"Microsoft® Computer Dictionary", Microsoft Press, Fifth Edition, Selected Pages.*
Kumar, Ela "Multiple Choice Questions in Computer Science", 2008, I.K. International Publishing House Pvt. Ltd.*
Parlante, Nick, "Linked List Basics" 2001 Published by http://Stanford.edu, Available at http://cslibrary.stanford.edu/103/LinkedListBasics.pdf.*
Parlante, Nick, "Pointers and Memory" 2001 Published by http://Stanford.edu, Available at http://cslibrary.stanford.edu/102/PointersAndMemory.pdf.*

* cited by examiner

| View Renewal Chain | | | | |
|---|---|---|---|---|
| MGACode | Effective Date | Policy Premium | Status | DocuView |
| ADWC812124 | 07/16/1997-07/16/1998 | 0.00 | Cancel Flat | |
| ADWC816510 | 07/01/1997-07/01/1998 | 86,443.00 | Expired | Yes |
| ADWC920947 | 07/01/1998-07/01/1999 | 18,530.00 | Expired | Yes |
| ADWC019331 | 07/01/1999-07/01/2000 | 14,284.00 | Expired | Yes |
| ADWC130168 | 07/01/2000-07/01/2001 | 0.00 | Cancel Flat | Yes |
| ADWC139073 | 07/01/2000-07/01/2001 | 4,548.00 | Expired | Yes |
| ADWC228103 | 07/01/2001-07/01/2002 | 9,673.00 | Expired | Yes |
| ADWC324590 | 07/01/2002-07/01/2003 | 13,423.00 | Expired | Yes |
| ADWC425943 | 07/01/2003-07/01/2004 | 6,406.00 | Inforce | Yes |

Select          X Cancel

FIG 1

INSURANCE POLICY RENEWAL CHAIN

RELATED APPLICATIONS

This application is a divisional of pending U.S. application Ser. No. 10/906,271, filed Feb. 11, 2005.

BACKGROUND OF THE INVENTION

Field of Invention

The present invention relates generally to the field of insurance policy issuance and management. More specifically, the present invention is related to the automated search for and linking of expired and current insurance policy terms to aid in the calculation of future policy terms.

Discussion of Prior Art

In the determination of insurance policy premiums and the calculation of future policy terms, and even when adjusting claims and calculating loss runs for policyholders insured under prior insurance policies, it becomes beneficial to maintain archives of and provide efficient access to the characteristics and data of previously issued policies. Currently, industry-wide standards typically call for existing policies, that are about to expire, to be renewed. The process of recalculating policy terms, in order to renew an insurance policy for a subsequent calendar year; is known as the "renewal" process. Because most companies do not retain expired insurance policies, the "renewal" process requires the manual re-computation of policy terms from information that must once again be gathered from the policyholder. In addition, policies that may have been incorrectly issued, either because of incomplete or inaccurate policy conditions, must be put through a process known as "cancel-flat re-issue". This process is very similar to the renewal process in that the policy terms and conditions must be carried forward to a new iteration of the policy's existence.

Often times, to assist in a re-computation of terms, a "pull forward" subfolder is created in which to "pull" and keep information from prior paper-based policies. In this manner, information from a prior policy's folder is copied and stored in the new policy's folder without having to have the entire prior policy folder pulled from the paper system.

For example, recalculating a workers compensation premium would require collecting from the policyholder, information such as number of accidents in the previous year, number of employees on payroll, the amount of payroll per employee, the job classification of the employees, experience modifications, merit modifications, etc. This process is not only duplicative and redundant; it is wasteful of resources that could be better allocated, i.e., to claims adjustment and new policyholder application issuance. Thus, there is a need in the industry for a resource conscious method of storing prior insurance policies.

Prior art methods relating to archival and version management include a method for storing related information in a single container data structure. U.S. Pat. No. 5,857,207 to Lo et al. discloses a method of pooling containers having multiple versions of a distinct document. Pooling containers are divided into layers wherein at most one unique version of a document is stored. Also disclosed is a mechanism for manipulating the distinct document to be used at a given time. However, Lo et al. fail to mention linking of or referencing between the distinct versions; the reference merely discusses distinct versions of a single document collocated within the same container.

U.S. Pat. No. 6,499,206 to Rivette et al. discloses a method for grouping documents automatically by utilizing system and user grouping constraints. Documents associated with the group may be mapped, linked to forwards and backwards citations, as well as bracketed and clustered. However, Rivette et al. limit their discussion to the location and grouping of keywords manually selected and input by the user; the system only searches for different grammatical variants of the user-input keyword. No mention is made of an automated search predicated solely on system-generated terms nor is any made of an allowance for terms having either constant or variable values.

U.S. Pat. No. 6,539,396 to Bowman-Amuah discloses a system and method for associating multiple versions of business objects with one another. A legacy system interconnected with a client via an integration architecture uses a legacy wrapper to communicate with a client. Although the calculation of insurance rates are mentioned, the calculation referred to pertains to communication regarding a single customer component of an insurance rate quote between a newer system of an independent agency and a legacy system of an insurance company. Bowman-Amuah fails to discuss or even mention accessing legacy information in the calculation of insurance rates. Rather, facilitating communication between legacy and newer protocols is discussed.

U.S. patent application publication 2003/01355520 A1 to Mitchell et al. discloses a method for storing different versions of a body of statutory law and judicial precedent. Different versions of bodies of law are linked and associated via pointers. A version of interest is accessed by navigating through a display along a hierarchical path. Also disclosed is a method of hyper-linking information included in the same file, record, or structured document. However, Mitchell et al. simply provide for a display of dates in association with selected versions of a particular portion of a body of law. Furthermore, particular portions of a body of law are simply linked based on their physical locations within a statute or code; no mention is made of a linking based on content or meaning of a particular portion or section of a selected body of law.

Although it is common practice to sort and search by either an insured business name or a tax identification number to find prior policies issued to a particular business, name searches are limited in their ability to provide prior policy information when an insured changes their business name, or, in the event that a search keyed on a tax identification number was performed, a business would appear to have duplicative insurance policy coverage, one policy for each tax identification number. Thus, the ability to accurately find, evaluate, and present all prior policy information corresponding to a particular insured business in a concise, chronological order is hindered.

Whatever the precise merits, features, and advantages of the above cited references, none of them achieves or fulfills the purposes of the present invention.

SUMMARY OF THE INVENTION

The system and method of the present invention provide for the automatic linking of expired, current, and future insurance policies. Within each insurance policy is a plurality of terms frequently used in the determination of an insurance policy premium or rate quote. Such terms are calculated based on information either associated with or obtained from a particular policyholder. By automatically linking policy information and policy terms from prior insurance policies, the present invention allows policy information previously submitted by a policyholder or calculated in regards to activity on a particular policy to be used in automatic calculation and generation of a future policy term. Also associated with a particular insurance policy for each insured member under the same policy are member identification (ID) information, effective coverage date range, policy premium information, and policy status. Policy status includes a designation of whether the policy was cancelled flat and reissued, expired and renewed, or cancelled and reinstated.

Utilizing a logical linked list to all of an insured's policies maintained by the system of the present invention ensures that policies are presented in chronological order regardless of changes in either a policyholder's name or tax identification number. In this manner, it is possible to collocate historical information and documents for all policies associated with a particular policyholder and to obtain immediate access to desired policy information. Thus, the need to sort policy information is obviated as is the need to perform an exhaustive manual search or even an electronic keyword search is obviated.

Thus, the present invention achieves straight-thru processing in organizing prior policies for assistance in renewals, loss ratio calculations, shifts in payroll numbers (i.e., the number of employees insured under a single policy), and previous claims activity under the same type of policy. Using the present invention, loss representatives are able to analyze new, system-generated calculations that are determined via triggers pulled from prior policies, as opposed to manually searching for prior policy terms and manually generating new policy terms.

BRIEF DESCRIPTION OF THE DRAWINGS

FIG. 1 is a screenshot of a Graphical User Interface (GUI) of the system of the present invention.

DESCRIPTION OF THE PREFERRED EMBODIMENTS

Figure 2:
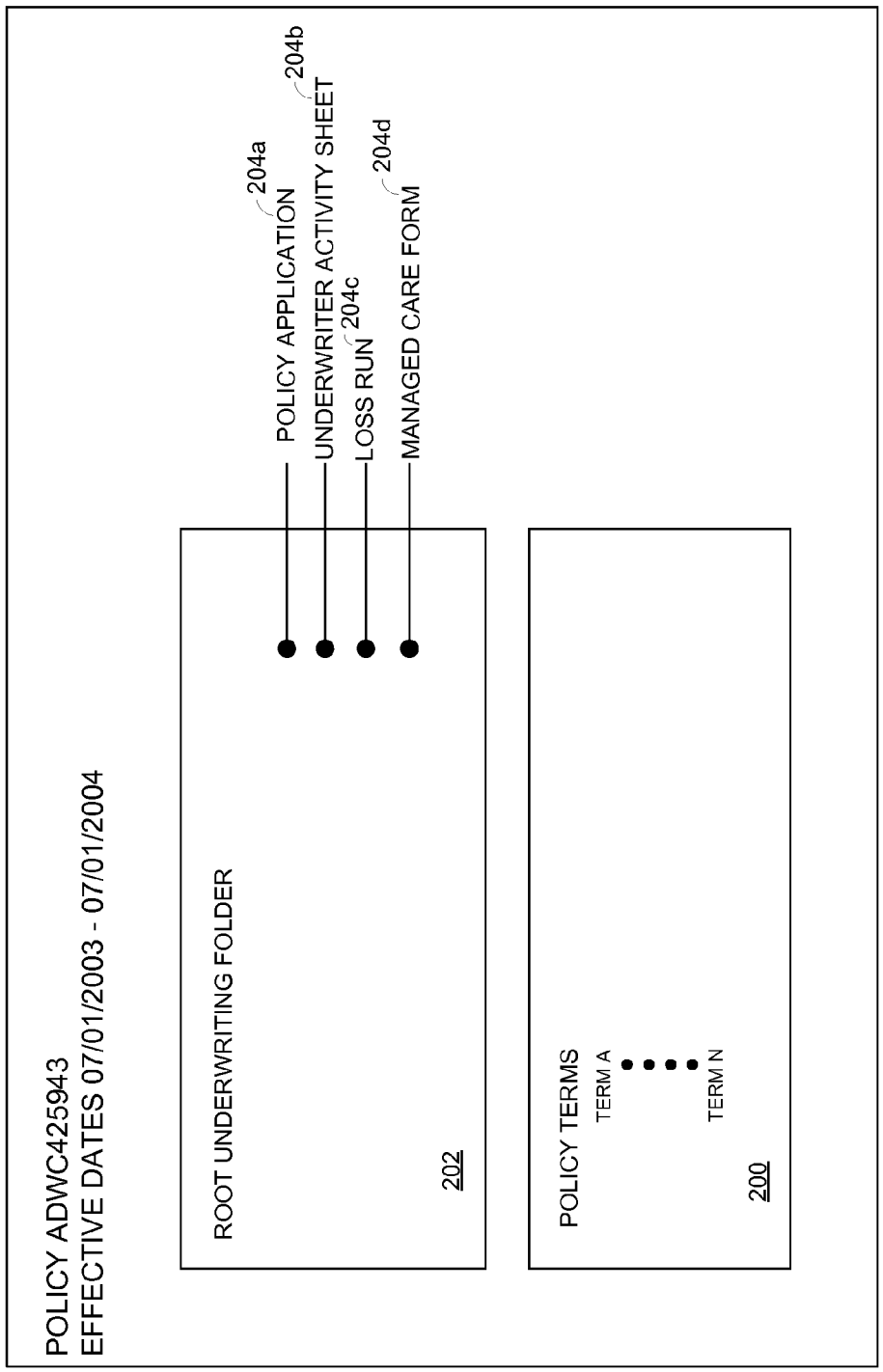
FIG. 2 illustrates a folder view of an insurance policy under review.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Because the volume of the base of insured policy members increases on a day-to-day basis, it is unlikely that simply archiving insurance policies would allow for efficient access on a need-to-know basis. For this reason, it is necessary to have some sort of consistent and efficient method of accessing the information contained within insurance policies previously issued for current policyholders.

Referring now to FIG. 1, a screenshot depicting a graphical user interface (GUI) of the present invention is shown. Policy terms calculated for previous years and for the current year are collocated in a single insurance policy folder. Each policy is also collocated with a root underwriting file, which functions as a placeholder for policy subfolders located at lower levels of hierarchy. A root folder is also used to store items that a user (i.e., an underwriter, adjustor, loss control representative, litigator, or subrogation specialist) needs to be immediately aware of. Essentially, items stored in a root folder are "red-flagged." For example, a policy that is currently the subject of litigation is noted such that a user is given ample notice to proceed with caution when working on the noted policy. When a user receives correspondence pertaining to a particular policy or a particular insured member's policy information, the correspondence becomes a part of the underwriting folder of the noted policy. Once the correspondence item is placed into the underwriting root folder of the noted policy, it becomes possible to "pull forward" certain application items to aid in the renewal process.

Items "pulled forward" are not physically removed from original policy folder locations, rather, a logical linked list is placed in the folder that "point" back to documents held in either expired or expiring policy folders. Thus, no manual process is required to actually "pull forward" or move or copy documents from one folder to another folder. The system of the present invention automatically creates a linked list linking documents from prior policies; these documents are chosen for linking based on business logic that changes from month to month, year to year.

Suggested items to be "pulled forward" include an insurance policy application, supplemental application, and account analysis; if the item is over three years old, a diary note is attached as a reminder to obtain a new or updated application prior to renewal. Other items to be pulled forward include, but are not limited to, the latest: underwriter activity sheets, E-mod (Q-mod) worksheets, schedule mod worksheets, Dun and Bradstreet™ reports, Drug-free workplace (DFWP) forms, managed care forms, loss runs, and loss control surveys. Other items of interest that may influence a future underwriter decision include officer election information. Once these items are pulled forward and placed in the underwriting folder of the noted policy, and underwriter is provided access necessary to determine new policy terms, without having to obtain or collect redundant data.

Shown in FIG. 2 is a policy folder 200 corresponding to an insurance policy currently under review by an underwriter. A root underwriting folder 202 is maintained within policy folder 200 and links to items either manually or automatically pulled forward 204a-d.

Figure 3:
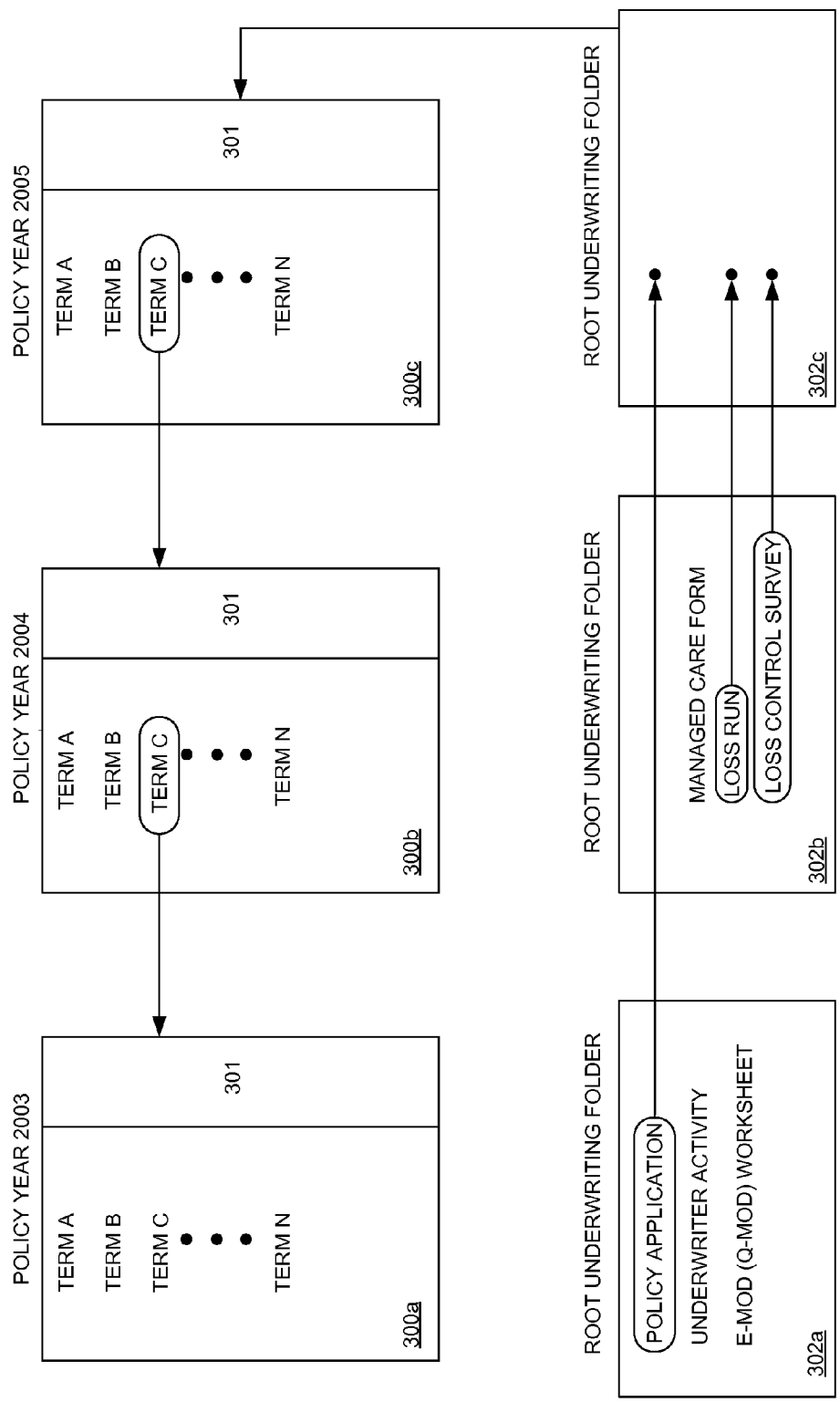
FIG. 3 illustrates items pulled forward and linked to an insurance policy under review and the propagation of a policy term to previous policy years.

Referring now to FIG. 3, items pulled forward from root underwriting folders 302a, b of policies issued in prior years 300a, b are linked to root underwriting folder 302c, for a policy currently under review 300c. Pulled forward items are evaluated to calculate a term or terms for policy under review 300c and used to adjust the renewal process. Changes made to policy under review 300c propagate all the way through prior policies 300a, b.

Figure 4:
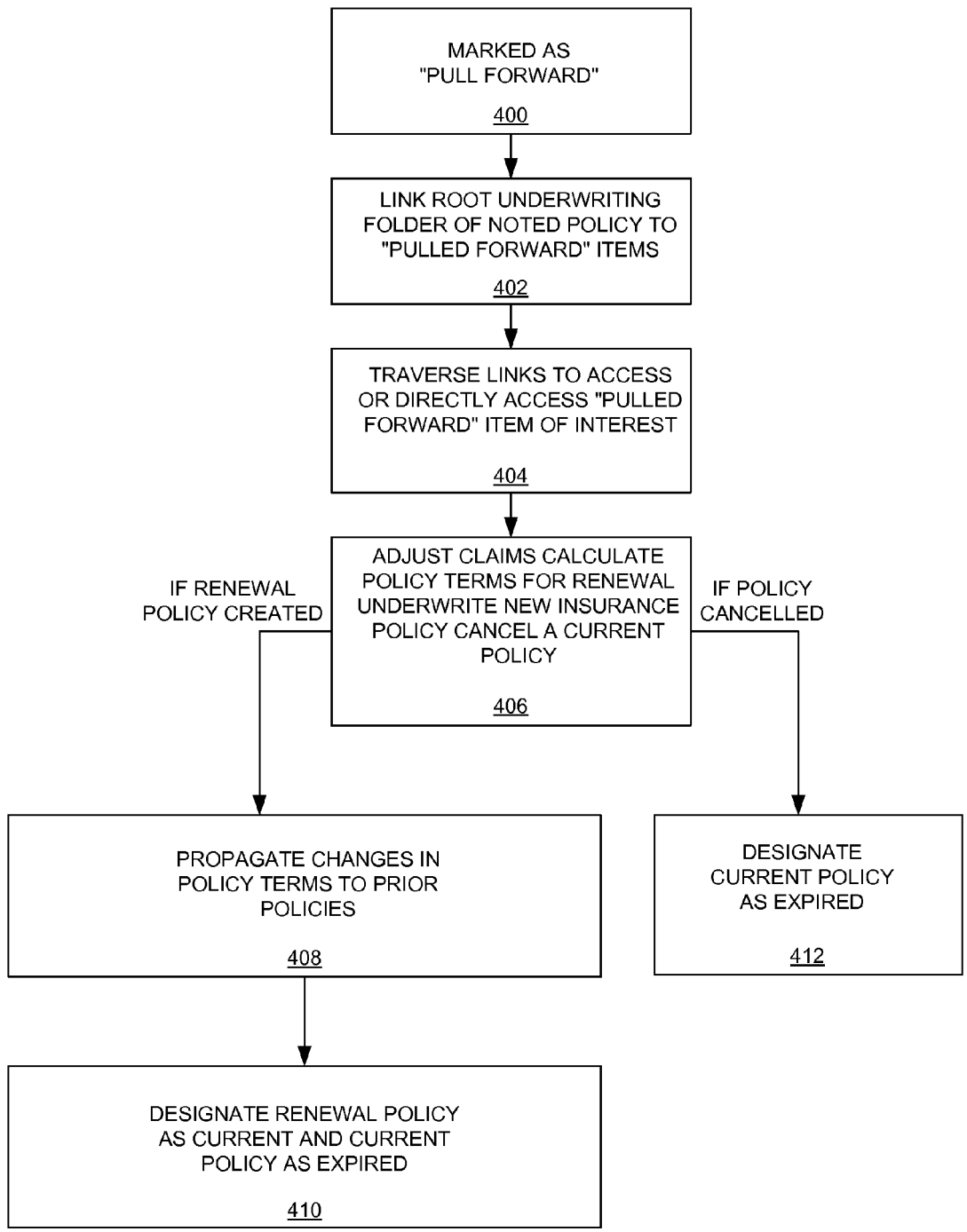
FIG. 4 is a process flow diagram for the method of the present invention.

Referring now to FIG. 4, a process flow diagram for calculating policy terms for an insurance policy of interest is shown. In step 400, items of interest in calculating renewal policy terms are marked as "pulled forward". In one embodiment, such items are comprised of the latest: insurance applications filled out by the insured, supplemental applications, underwriter activity sheets, E-mod worksheets, schedule mod worksheets, Dun and Bradstreet™ reports, officer election information, Drug-free workplace (DFWP) forms, managed care forms, loss runs, and loss control surveys. Items marked as "pulled forward" are then linked to a root underwriting folder collocated with the insurance policy of interest in step 402.

Subsequently in step 404, links are traversed to obtain specific information from any one of the items marked as pulled forward. If the location of the specific information is known, it is possible to access the information directly. Following in step 406, claims are adjusted, renewal policy terms are calculated, new insurance policy terms are underwritten, or a current policy is cancelled based on the insurance policy of interest. If it is determined in step 406 that a renewal policy is created, policy terms determined for the renewal policy are propagated to policies previously issued in step 408. In step 410, the policy of interest for which policy terms were calculated is designated as a current policy and a current policy is designated as expired. If it is determined in step 406 that the policy of interest was cancelled, the policy of interest is designated as expired in step 412.

Furthermore, the method of the present invention does not require navigation along a path; if the identity of a prior or previous insurance policy term is known, direct access is possible. This obviates the need for a manual search, terms such as payroll numbers are located instantaneously; relevant terms in previously issued policies are flagged for review in underwriting a current policy.

Additionally, the present invention provides for an article of manufacture comprising computer readable program code contained within implementing one or more modules to link previous insurance policy information to a current insurance policy under review. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) linking policy terms and information used in underwriting a prior policy term; (b) calculating policy terms for a current policy under review; (c) propagating calculated policy terms to prior policies; and (d) providing instantaneous access to policy terms from prior years.

Also, implemented in computer program based products are software modules for:
creating an object representing an insured, effective range date of an insurance policy premium and policy status;
linking a current policy for a current calendar year to at least one of: an expired policy for a calendar year prior to said current calendar year and a renewal policy issued for a following calendar year; and
traversing said links to perform any of: adjusting claims for a prior calendar year, underwriting an insurance policy, creating a renewal policy, and canceling an insurance policy operations.

CONCLUSION

A system and method has been shown in the above embodiments for the effective implementation of an insurance policy renewal chain in a digital paperless environment. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware, subject matter of term calculation.

The above enhancements are implemented in various computing environments. For example, the present invention may be implemented on a conventional PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (e.g, CRT, LCD, etc.) and/or hardcopy (e.g., printed) formats. The programming of the present invention may be implemented by one having ordinary skill in the art of graphics or object-oriented programming.

The invention claimed is:

1. A system for renewing an insurance policy of interest without collecting redundant data, the system comprising:
a processor; and
a memory comprising instructions which, when executed by the processor, cause the processor to:
 a. identify an insurance application filled out by the insured and a plurality of the following documents of interest that relate to the insurance policy of interest: previously completed application for the policy of interest, supplemental application for the policy of interest, underwriter activity sheet, E-mod worksheet, schedule mod worksheet, officer election, drug-free workplace (DFWP) form, managed care form, loss run, and loss control survey information;
 b. automatically create a logical linked list from documents of interest in (a) chosen for linking based on a business logic that is changed at predefined periods, where documents of interest in (a) are pulled forward as they are not copied or moved to a current working folder, but the logical linked list providing links pointing back to pulled forward documents;
 c. traverse the logical linked list and obtaining information from the documents of interest in (a) related to the insurance policy of interest;
 d. determine terms associated with the insurance policy of interest to be renewed based on information obtained by traversing in (c); and
 e. output determined terms in (d) as part of renewal of the insurance policy of interest, where documents of interest in (a) are pulled forward via the logical linked list without having to collect redundant data.

2. The system of claim 1, wherein the documents of interest in (a) are previously flagged documents.

3. A system for renewing an insurance policy of interest without collecting redundant data, the system comprising:
a processor; and
a memory comprising instructions which, when executed by the processor, cause the processor to:
 a. identify an insurance application filled out by the insured and a plurality of the following documents of interest that relate to the insurance policy of interest: underwriter activity sheets, schedule mod worksheets, Dun and Bradstreet reports, drug-free workplace (DFWP) forms, managed care forms, loss-runs, loss control surveys, a previously completed policy application, a previously completed supplemental policy application, or a previously completed account analysis;

b. automatically create a logical linked list from documents of interest in (a) chosen for linking based on a business logic that is changed at predefined periods, where documents of interest in (a) are pulled forward as they are not copied or moved to a current working folder, but the logical linked list providing links pointing back to pulled forward documents;

c. traverse the logical linked list and obtaining information from the documents of interest in (a) related to the insurance policy of interest;

d. determine terms associated with the insurance policy of interest to be renewed based on information obtained by traversing in (c);

e. output determined terms in (d) as part of renewal of the insurance policy of interest, where documents of interest in (a) are pulled forward via the logical linked list without having to collect redundant data.

4. The system of claim 3, wherein the documents of interest in (a) are previously flagged documents.

5. An article of manufacture comprising a tangible non-transitory medium having computer readable program code embodied therein which implements a method for renewing an insurance policy of interest without collecting redundant data; said medium comprising:

a. computer readable program code identifying an insurance application filled out by the insured and a plurality of the following documents of interest that relate to the insurance policy of interest: previously completed application for the policy of interest, supplemental application for the policy of interest, underwriter activity sheet, E-mod worksheet, schedule mod worksheet, officer election, drug-free workplace (DFWP) form, managed care form, loss run, and loss control survey information;

b. computer readable program code automatically creating a logical linked list from documents of interest in (a) chosen for linking based on a business logic that is changed at predefined periods, where documents of interest in (a) are pulled forward as they are not copied or moved to a current working folder, but the logical linked list providing links pointing back to pulled forward documents;

c. computer readable program code traversing the logical linked list and obtaining information from the documents of interest in (a) related to the insurance policy of interest;

d. computer readable program code determining terms associated with the insurance policy of interest to be renewed based on information obtained by traversing in step (c); and e. computer readable program code outputting determined terms in step (d) as part of renewal of the insurance policy of interest, where documents of interest in (a) are pulled forward via the logical linked list without having to collect redundant data.

6. The article of manufacture of claim 5, wherein the documents of interest in (a) are previously flagged documents.

7. An article of manufacture comprising a tangible non-transitory medium having computer readable program code embodied therein which implements a method for renewing an insurance policy of interest without collecting redundant data; said medium comprising:

a. computer readable program code identifying an insurance application filled out by the insured and a plurality of the following documents of interest that relate to the insurance policy of interest: previously completed application for the policy of interest, supplemental application for the policy of interest, underwriter activity sheet, E-mod worksheet, schedule mod worksheet, officer election, drug-free workplace (DFWP) form, managed care form, loss run, and loss control survey information, wherein the documents of interest are previously flagged documents;

b. computer readable program code automatically creating a logical linked list from the previously flagged documents of interest in (a) chosen for linking based on a business logic that is changed at predefined periods, where documents of interest in (a) are pulled forward as they are not copied or moved to a current working folder, but the logical linked list providing links pointing back to pulled forward documents;

c. computer readable program code traversing the logical linked list and obtaining information from the previously flagged documents of interest in (a) related to the insurance policy of interest;

d. computer readable program code determining terms associated with the insurance policy of interest to be renewed based on information obtained by traversing in step (c); and e. computer readable program code outputting determined terms in step (d) as part of renewal of the insurance policy of interest, where the previously flagged documents of interest in (a) are pulled forward via the logical linked list without having to collect redundant data.

* * * * *